United States Patent [19]
König

[11] Patent Number: 5,103,529
[45] Date of Patent: Apr. 14, 1992

[54] SUPPORT BEARING WITH RETAINER

[75] Inventor: Werner König, Stuttgart, Fed. Rep. of Germany

[73] Assignee: Mercedes-Benz AG, Fed. Rep. of Germany

[21] Appl. No.: 674,159

[22] Filed: Mar. 25, 1991

[30] Foreign Application Priority Data

Apr. 12, 1990 [DE] Fed. Rep. of Germany ....... 4011854

[51] Int. Cl.$^5$ ..................... B65D 55/00; B62D 23/00
[52] U.S. Cl. ........................................ 16/2; 296/35.1
[58] Field of Search ............... 16/2; 296/35.1

[56] References Cited

U.S. PATENT DOCUMENTS

| | | | |
|---|---|---|---|
| 2,188,596 | 1/1940 | Hobert | 16/2 |
| 2,976,080 | 3/1961 | Moore | 296/35.1 |
| 3,479,081 | 11/1969 | Schaaf | |
| 3,895,408 | 7/1975 | Leingang | 16/2 |

FOREIGN PATENT DOCUMENTS 960401  3/1957  Fed. Rep. of Germany.
2122555 1/1984  United Kingdom.

*Primary Examiner*—Robert L. Spruill
*Assistant Examiner*—Carmine Cuda
*Attorney, Agent, or Firm*—Evenson, Wands, Edwards, Lenahan & McKeown

[57] ABSTRACT

A structure is provided to retain in an axial direction a support bearing inserted into a receiving lug of a vehicle part. Such support bearings have a rubber bush which projects with its endpieces out of the receiving lug, possesses a bearing core and is supported on one side of the receiving lug by means of a flange of a sheet-metal casing. An annular-bead-like bush endpiece facing away from the flange engages over an edge on the other side of the receiving lug. The retention structure can be in the form of a circumferential groove in the annular-bead-like bush endpiece, into which, after the support bearing has been introduced into the receiving lug, a spring ring can be inserted a spring ring which, in the inwardly spread state, has a diameter larger than the inside diameter of the receiving lug. The spring ring thus prevents axial shifting of the support bearing in a direction in which the bead-like bush endpiece would be drawn into the receiving lug.

3 Claims, 1 Drawing Sheet

SUPPORT BEARING WITH RETAINER

BACKGROUND AND SUMMARY OF THE INVENTION

The present invention relates to a retention for a support bearing so that axial shifting of the support bearing is prevented in a direction in which a bead-like bush endpiece may be drawn in a receiving lug.

In an installed state, a rubber bush of support bearings is subjected to shearing stresses. For the installation of the support bearing in a vehicle part, the bush has to be pressed with a tight fit into a corresponding receiving lug. For this, the rubber bush is introduced into the receiving lug with its bush endpiece facing away from the flange of the sheet-metal casing and resembling an annular bead, for which purpose the bush endpiece is correspondingly radially compressed. When the rubber bush reaches its final installation position, the annular bead-like bush endpiece extends out of the receiving lug, expands in the radial direction, engages over the edge of the receiving lug and thus forms an axial stop which, together with the flange of the rubber bush bearing against the opposite edge of the receiving lug, retains the rubber bush in its installation position. This axial stop, at the same time, forms a buffer for a stop plate which is arranged on a clamping screw passing through the bearing core and to be screwed together with the other vehicle part to limit the axial travel of the support bearing in one direction.

In support bearings installed in subframes with their axes in the vertical direction, the rubber bush is subjected to especially high stresses in the axial direction, i.e. shearing stresses. In this connection, it has been a surprising discovery to find that, under pronounced vertically relative movements between the subframe and vehicle body, the flange and annular bead-like bush endpiece can provide a reliable axial retention of the rubber bush. In contrast, the result of axially directed, high-frequency vibrations is that the rubber bush, although being mounted in the receiving lug with a high radial prestress, shifts axially in. The stop formed by the bush endpiece engaging behind the edge of the receiving lug and resembling an annular bead is thereby overcome, and the bush endpiece is undesirably drawn into the receiving lug. Consequently, the buffer member provided between the receiving lug and the stop plate arranged on the clamping screw is then absent, so that the bearing flexibility in the particular axial direction is correspondingly reduced. When there are vertical movements between the vehicle body and subframe, therefore, the stop plate strikes directly against the subframe even after only a relatively short axial travel, thus considerably restricting driving comfort.

A conventional support bearing is shown in GB2,122,555 A. In addition, U.S. Pat. No. 3,479,081 also describes a support bearing with a rubber bush having supporting elements which prevent the rubber bush from shifting axially in the orifice receiving the bush. The supporting elements form integral parts of a double-conical sleeve which constitutes the bearing core and the double cone of which is slotted along generatrices. The clamping screw passing through the sleeve is screwed into an internal sleeve thread. As a result of the tightening of the clamping screw, the sleeve ribs formed by the slot buckle, with the sleeve at the same time being shortened axially, and the rubber bush expands radially to such an extent that an axial movement in the orifices receiving it is no longer possible.

The screwing of the clamping screw together with the sleeve does not make it possible to fix the bearing core to a vehicle part with a specific pressure force. Moreover, in this bearing construction, it is not possible to equip the rubber bush with a sheet-metal casing. Finally, the axial flexibility is dependent on the radial bracing of the rubber bush.

German Patent Specification 960,401 shows how to retain an elastic plastic bush axially in the bore of a bearing body with a spring ring. For this purpose, a groove is formed both in the outer circumference of the bush and in the inner circumference of the bore of the bearing body. To mount the bush, the spring ring is inserted into its circumferential groove and compressed radially. When the grooves of the bush and of the bearing-body bore are located opposite one another, the spring ring springs open, and it is now in engagement half with one of the two grooves and half with the other.

A retention of this type is not practical for support bearings, since the sheet-metal casing provided on such bearings is either vulcanized onto the circumference of the rubber bush or vulcanized into this in such a way that only a thin rubber layer remains on this. A spring ring introduced between the rubber bush and receiving lug would therefore prevent the bearing from being removed because the sheet-metal casing would exert on the spring ring an axial force which would lead to a gripping between the wall parts of the two grooves preventing the spring ring from being compressed radially.

An object of the present invention is to provide a retention for a support bearing retention structure in which the bush endpiece is a circumferential groove into which, after the support bearing has been introduced into a receiving nut, a spring ring can be inserted to guarantee that, even under the influence of relatively high axially directed vibrations, the rubber bush can no longer shift in the receiving lug in the direction of the other vehicle part.

This object has been achieved in accordance with the present invention by further providing that the spring ring, in an inwardly spread state, has a diameter larger than the inside diameter of the receiving lug.

The spring ring inserted into the circumferential groove of the annular-bead-like bush endpiece engages over the edge of the receiving lug and thus prevents the bush endpiece from being drawn into the latter. At the same time, the circumferential groove can be formed in the bush endpiece on its inner circumference or on its outer circumference. In the former case, the dimensions of the spring ring must be such that, in the radially compressed state, its outside diameter, and in the latter case its inside diameter, is larger than the inside diameter of the receiving lug.

BRIEF DESCRIPTION OF THE DRAWINGS

These and other objects, features and advantages of the present invention will become more apparent from the following detailed description of several preferred embodiments when taken in conjunction with the accompanying drawings wherein.

DETAILED DESCRIPTION OF THE DRAWINGS

Figure 1:
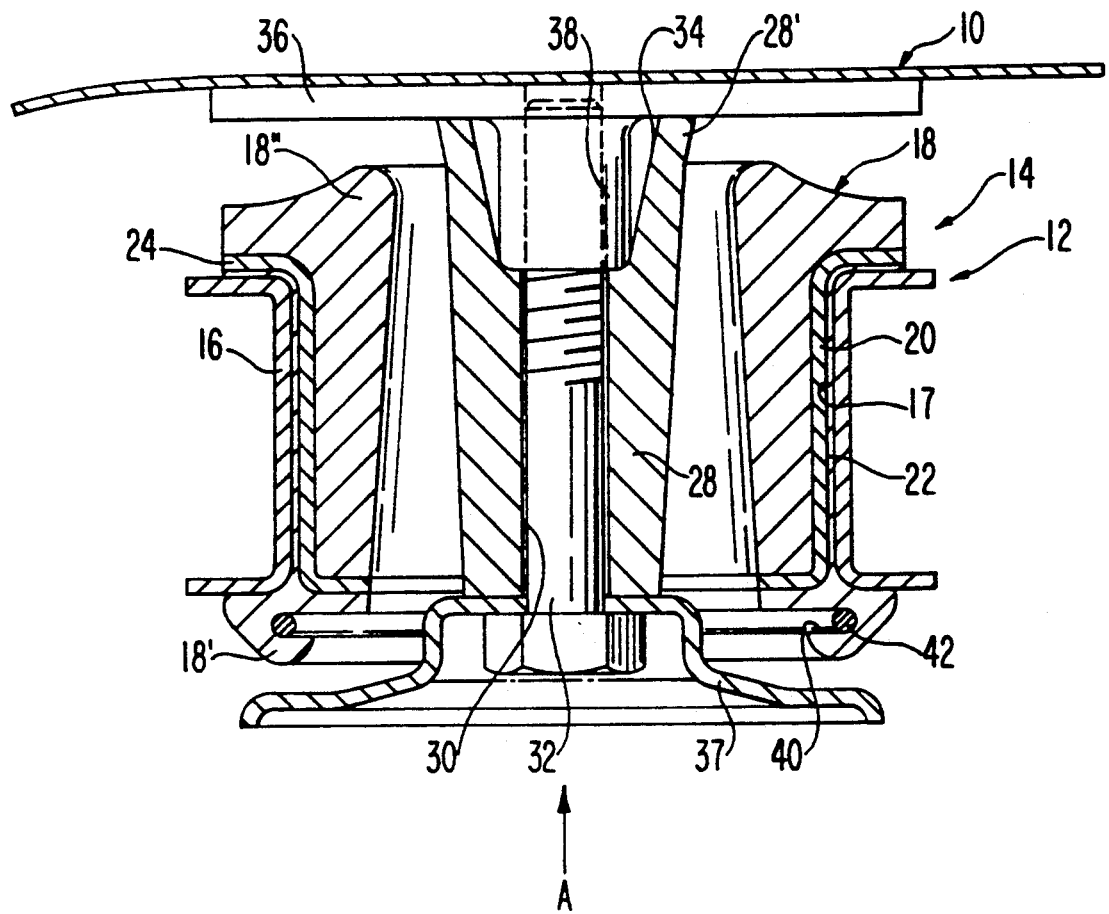
FIG. 1 is a longitudinal sectional view through a support bearing inserted into a subframe and screwed to a vehicle body.

A passenger car vehicle body is designated by the numeral 10, and for example, a subframe designated by the numeral 12 is secured elastically to the body 10. Securing of the body 10 with the subframe 12 is carried out by support bearings 14 which operate as thrust bearings and which are each pressed into a respective receiving lug 16 of the subframe 12.

The support bearings 14 have a rubber bush 18 with a sheet-metal casing 20 vulcanized-in such that the casing 20 is coated on the outer circumference with a thin rubber layer 22. The sheet-metal casing 20 can, however, also be vulcanized onto the outer circumference of the rubber bush. A flange 24 is formed on one endpiece of the sheet-metal casing 20, while its other endpiece terminates, for example, flush with the underside of the receiving lug 16.

An annular-bead-like bush endpiece 18' faces away from the flange 24, and the other bush endpiece 18" also forms an annular bead which covers the flange 24 and constitutes a stop buffer. A bearing core 28 projects with a plane endpiece 28' out of the annular bead 18" and is vulcanized in a known way into connecting webs of the rubber bush 18 which are assigned diametrically to one another. A bore 30 passes axially through the bearing core 28 for receiving a clamping screw 32 and projects with its shank end into a recess 34 accessible in the endpiece 28' of the bearing core 28 from the end face of the latter.

As is clearly shown, in the installation position of the support bearing 14 in the subframe 12, the annular-bead-like bush endpiece 18' engages behind the edge of the receiving lug 16. The flange 24 engages over the opposite edge of the receiving lug 16. The flange 24 and the bush endpiece 18' thus fix the installation position of the support bearing 14 in the subframe 12. The diameter of the sheet-metal casing 20 is sized with respect to the inside diameter of the receiving lug 16 such that the rubber bush 18 rests with its outer rubber layer 22 is press fit in the orifice 17 of the receiving lug 16.

At each of the points of connection of the subframe 12 to the vehicle body 10, a plate-shaped connection element 36 with a downwardly projecting collar 38 having an internal thread is provided on the body. This element 36 is brought into centering engagement with the recess 34 in the end face of the bearing core 28, whereupon a clamping screw 32 carrying a stop plate 37 supported on the bearing core 28 is screwed into its internal thread so that the bearing core 28 and collar 38 are thereby blocked firmly relative to one another.

For mounting a support bearing 14, the rubber bush 18 thereof is introduced with the annular-bead-like bush endpiece 18' into the receiving lug orifice 17, which is widened somewhat by an edge rounding, during the pressing in of the rubber bush 18. This bush endpiece 18' is thus correspondingly reduced in diameter as a result of radial deformation. When the bush endpiece 18' reemerges from the receiving lug orifice 17, it relaxes, expands radially correspondingly and engages behind the orifice edge.

The support bearing is formed with a retention so that shearing forces exerted oppositely to the pressing-in direction (arrow A) or high frequency axial vibrations are prevented from shifting the support bearing 14 in the receiving lug 16 in the direction of the arrow A. In the embodiment of FIG. 1, this retention is in the form of a circumferential groove 40 which is formed on an inner circumference in the annular-bead-like bush endpiece 18' and into which is inserted an expanding spring ring 42. The diameter of the circumferential groove 40 and the spring ring 42 are so sized in relation to the inside diameter of the receiving lug 16 that at least the ring outside diameter is larger than the inside diameter of the receiving lug 16, in the inwardly spread state of the spring ring 42. In the event of a particular axial shift of the support bearing 14, the spring ring 42 thus performs a stopping function, in that it is then supported on the subframe 12 in the edge region of the orifice 17.

Figure 2:
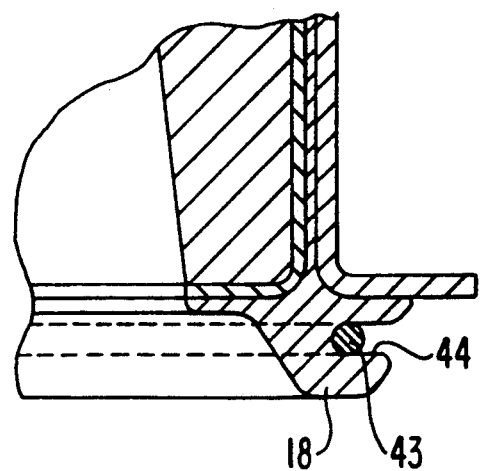
FIG. 2 is a partial longitudinal sectional view through the bead-shaped bush endpiece of an alternative embodiment of a support bearing inserted into a subframe and retained in accordance with the present invention.

In an alternative embodiment according to FIG. 2, the retention is in the form of a circumferential groove 44 receiving a spring ring 43 and formed in the outer circumference of the annular-bead-like bush endpiece 18'. The diameter of these parts must be sized such that, in the inwardly spread state, the inside diameter of the spring ring 43 is larger than the inside diameter of the receiving lug 16.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A retainer for a support bearing which is inserted into a receiving lug of a vehicle part and which has a rubber bush to project with endpieces thereof out of the receiving lug, a bearing core and a flange of a vulcanized-on or vulcanized-in sheet metal casing for support on one side of the receiving lug such that one of the bush endpiece faces away from the flange and has an annular bead form to engage over an edge on the other side of the receiving lug, wherein a circumferential groove is formed in the bush endpiece having an annular bead form into which groove, after the support bearing has been introduced into the receiving lug, a spring ring is inserted, which spring ring, in an inwardly spread state, has a diameter larger than the inside diameter of the receiving lug.

2. The retainer according to claim 1, wherein the circumferential groove is formed at an inner circumference of the bush endpiece having an annular bead form.

3. The retainer according to claim 1, wherein the circumferential groove is formed at an outer circumference of the bush endpiece having an annular bead form.

* * * * *